(12) United States Patent
Emile et al.

(10) Patent No.: US 11,736,542 B2
(45) Date of Patent: Aug. 22, 2023

(54) ORGANIZER PLATFORM FOR SPEED DATING EVENTS

(71) Applicant: Lynk Technology Holdings, Inc., Dallas, TX (US)

(72) Inventors: Jeff Emile, Los Angeles, CA (US); Mark Brown, Los Angeles, CA (US)

(73) Assignee: Lynk Technology Holdings, Inc., Dallas, TX (US)

( * ) Notice: Subject to any disclaimer, the term of this patent is extended or adjusted under 35 U.S.C. 154(b) by 0 days.

(21) Appl. No.: 17/724,478

(22) Filed: Apr. 19, 2022

(65) Prior Publication Data

US 2022/0337639 A1    Oct. 20, 2022

Related U.S. Application Data

(60) Provisional application No. 63/176,633, filed on Apr. 19, 2021.

(51) Int. Cl.
*H04L 65/403* (2022.01)
*G06F 3/0484* (2022.01)
*G06F 3/0482* (2013.01)
*G06Q 50/00* (2012.01)

(52) U.S. Cl.
CPC ........ *H04L 65/4046* (2013.01); *G06F 3/0482* (2013.01); *G06F 3/0484* (2013.01); *G06Q 50/01* (2013.01)

(58) Field of Classification Search
CPC .................................................. H04L 65/4046
See application file for complete search history.

(56) References Cited

U.S. PATENT DOCUMENTS

| | | | | |
|---|---|---|---|---|
| 9,264,462 | B2* | 2/2016 | Heiferman | G06Q 30/02 |
| 11,516,519 | B1* | 11/2022 | Beswick | H04N 21/431 |
| 2008/0040142 | A1* | 2/2008 | Liu | G06Q 10/109 |
| | | | | 705/319 |
| 2013/0212199 | A1* | 8/2013 | Ekberg | G06Q 10/10 |
| | | | | 709/206 |
| 2022/0148097 | A1* | 5/2022 | Miller | H04L 51/046 |

* cited by examiner

*Primary Examiner* — Roland J Casillas
(74) *Attorney, Agent, or Firm* — Clayton, McKay & Bailey, PC

(57) ABSTRACT

Examples can include a system for video chat cycles within a social media application. An organizer platform can be used to design a schedule for the video chat cycles. This can include scheduled organizer content before, after, and between video chats. The organizer content can include graphics, video, and even live streams by the organizer.

20 Claims, 6 Drawing Sheets

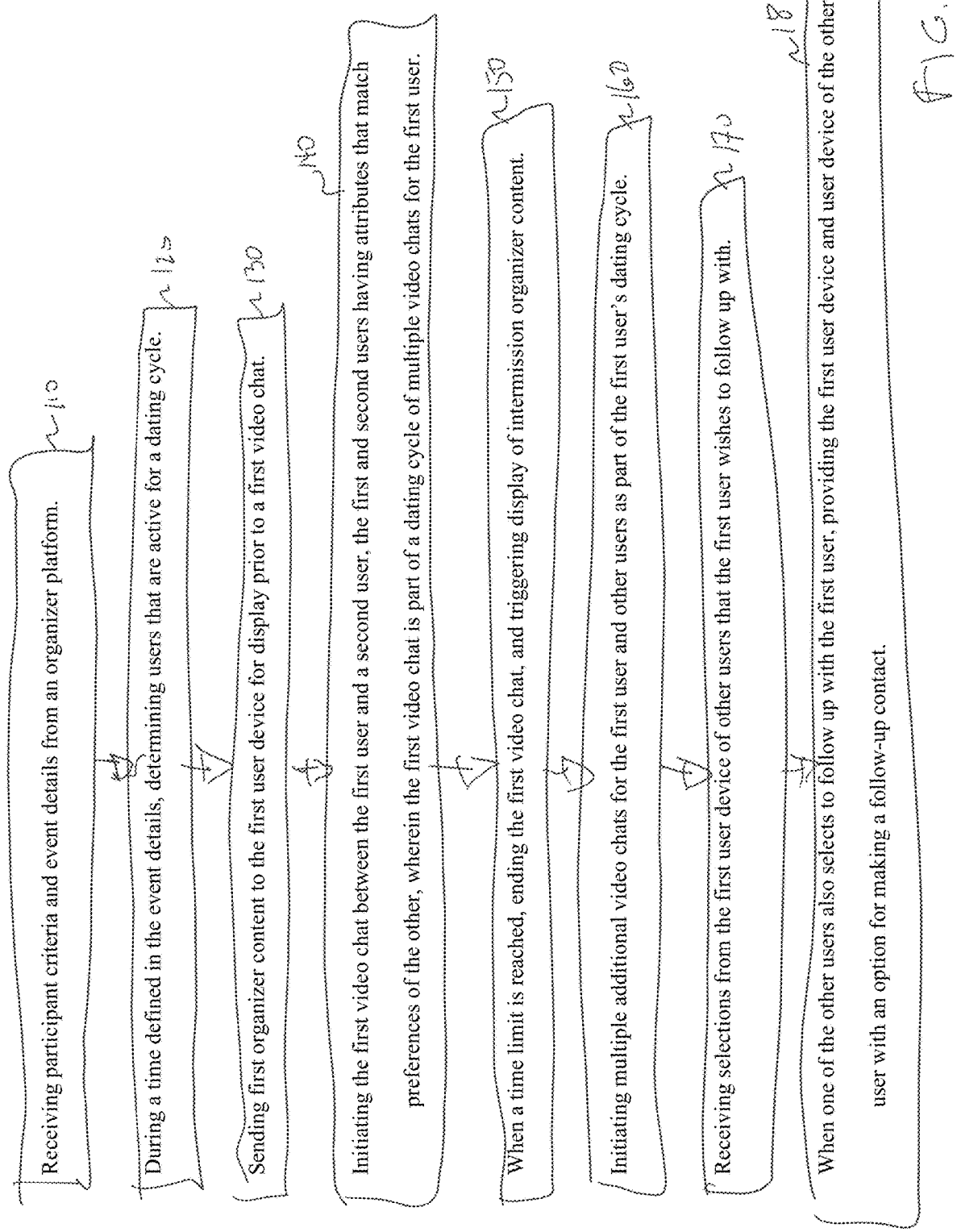

Receiving, on a graphical user interface ("GUI") displayed on a user device, a selection to create a new event; ~210

Selecting an event format for the event, wherein the event format determines a schedule for staggering organizer content and video chat cycles; ~220

Receiving event details, including start and end times; ~230

Receiving organizer content to display during the event on user devices that participate in the video chat cycles; and ~240

Receiving a selection to publish the event, wherein the event is joinable by user devices for participants that meet criteria of the event details, and wherein the organizer content and dating cycles occur at the joined user devices at times based on the event details and event format. ~250

ORGANIZER PLATFORM FOR SPEED DATING EVENTS

CROSS-REFERENCE TO RELATED APPLICATIONS

This application is a non-provisional of and claims priority to U.S. provisional application No. 63/176,633, titled "Organizer Platform for Speed Dating Events," filed Apr. 19, 2021, the contents of which are incorporated herein in their entirety.

BACKGROUND

People are constantly looking for new ways to connect and meet with compatible mates. Doing so has become more difficult as people's lives have become busier. Existing social media platforms and dating applications have also contributed to isolating social patterns and paradoxically have made it more difficult in some situations to establish meaningful relationships. Users of dating applications either fail to initiate meaningful conversation or end up on a full date with someone that they quickly realize is incompatible. Currently technologies do not provide a way to quickly meet multiple potential matches in a meaningful enough way. As a result, users cannot easily narrow down individuals to determine who to invest more time with.

Additionally, many people are drawn to dating-based reality television shows. People enjoy watching others attempt to interact on dates, which can yield useful insight that may spare a person from making similar mistakes. However, this such reality television does not apply to online dating. Currently, no online dating platforms integrate any way for a user to build confidence that may be necessary for the user to successfully engage with others on the platform. Instead, users typically must attempt to navigate the platform by interacting with other users that may be more familiar with the online dating, which can lead to early negative results that disincentivize further engagement with the dating platform.

Currently, there is no way to easily organize online dating events in a way that attracts participation and benefits the organizer. Therefore, a need exists for organizer platforms for speed dating events.

SUMMARY

The examples described herein specifically address technical problems and limitations of current dating platforms. The examples include a computing device, such as a personal computer, tablet, or laptop, that executes a dating or meetup application. The application can be installed on the device or can be a web application. A server can match the user with other users on the system and perform a series of video chats as part of a vide chat cycle.

An organizer platform can allow an organizer to create dating or mingling events that utilize the application and the video chat cycles. A server can run the platform and perform stages for creating the events based on inputs at a user device GUI by the organizer. The server can receive participant criteria and event details from an organizer platform. During a time defined in the event details, the server can determine users that are active for a dating cycle, including a first user associated with a first user device that executes a dating application.

Prior to a first video chat of the cycle, the server can send first organizer content to the first user device for display. Then, the server can initiate the first video chat between the first user and a second user, the first and second users having attributes that match preferences of the other, wherein the first video chat is part of a dating cycle of multiple video chats for the first user. When a time limit is reached, the server can end the first video chat, triggering display of intermission organizer content at the user devices. Display of intermission organizer content between video chats can be governed by the event details entered by the organizer on the organizer platform. After this organizer content (such as sponsorship material, organizer message, or an ad) is displayed, the app can initiate multiple additional video chats for the first user and other users as part of the first user's dating cycle.

At the end of the dating cycles, the server can receive selections from the first user device of other users that the first user wishes to follow up with. When one of the other users also selects to follow up with the first user, the server can provide the first user device and user device of the other user with an option for making a follow-up contact.

To create an event the organizer can select to create an event on a graphical user interface ("GUI") displayed on a user device. Then, using the GUI of the organizer platform, the organizer can select an event format for the event. The event format can determine a schedule for staggering organizer content amidst video chat cycles. For example, between certain video chats organizer content can appear on the participating user devices. The GUI can receive event details, including start and end times. The GUI can also receive organizer content to display during the event on user devices that participate in the video chat cycles. Then the GUI can receive a selection to publish the event.

The event can be joinable by user devices for participants that meet criteria of the event details, such as those that have been invited and have a password. The organizer content can be displayed and dating cycles occur at the joined user devices at times based on the event details and event format.

A user that participates in the event can open their application and find the event in the GUI. The GUI can display a list of events including an organizer-created event. For example, events can be displayed based proximity to the user's geographic location and/or start time. The organizer-created event can display with a start time and admission fee.

The participating user can select to attend the organizer created event, including submission of a password for the event. Then the event can proceed according to the format and schedule designed on the organizer platform. This can include video chatting multiple times according to a chat cycle defined for the event, with organizer content interspersed within the chat cycle, such as between first and second of the video chats.

The user devices can receive the organizer content to display during the event. Then, at the times specified in the event format, the GUI on the user devices can play an organizer-created video. This can include displaying the video at a conclusion of the dating cycle in an example.

BRIEF DESCRIPTION OF THE DRAWINGS

FIG. 1 is an example flow chart showing example stages for a server creating and orchestrating a speed dating event.

FIG. 2 is an example flow chart showing example stages of an organizer platform for an organizer-created speed dating event.

FIG. 4 is intentionally omitted.

FIGS. 6 and 7 include screen shots of the organizer platform GUI.

DESCRIPTION OF THE EXAMPLES

Figure 3:
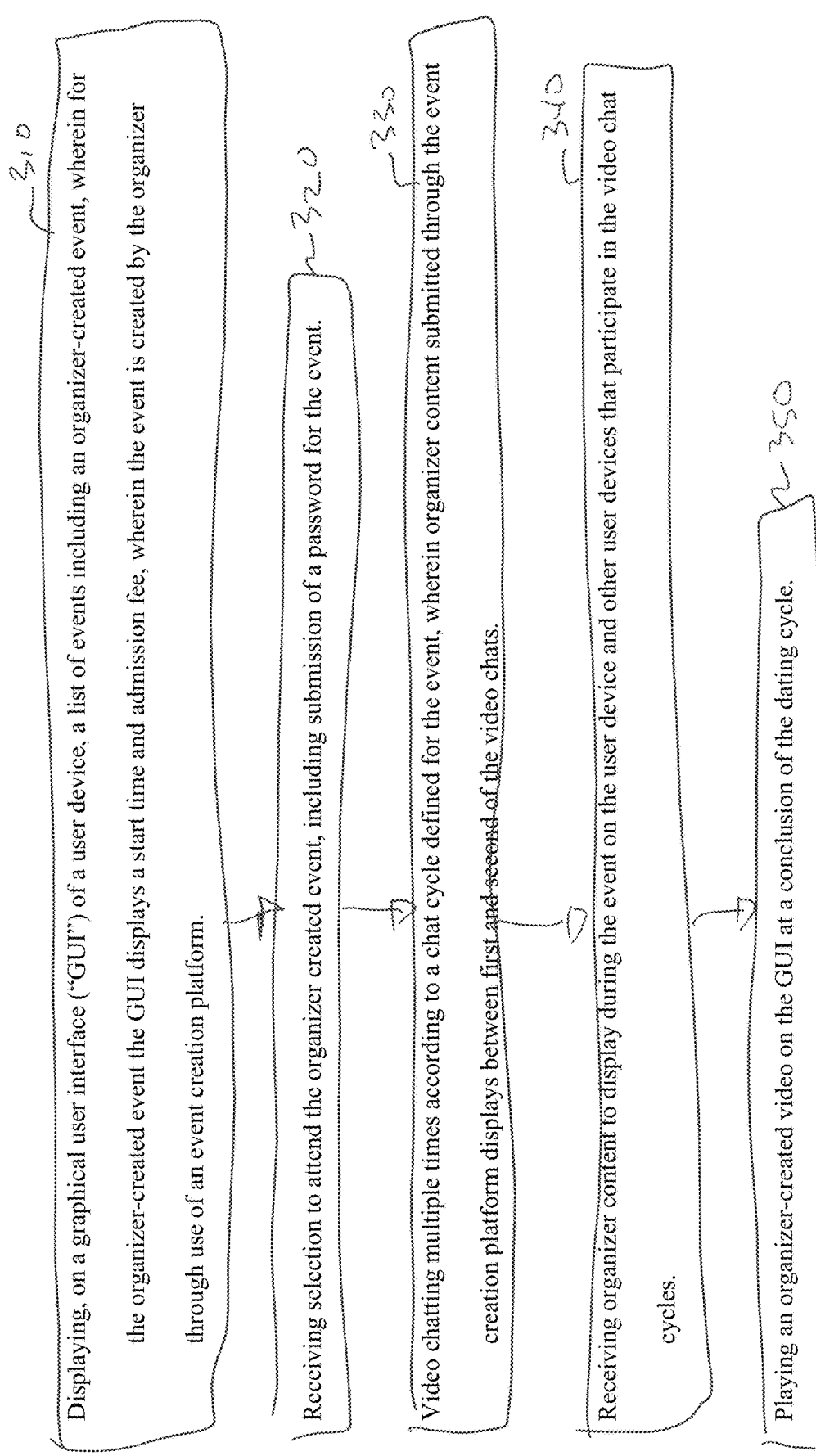
FIG. 3 is an example flow chart for an organizer-created speed dating event that incorporates live messaging from the organizer.

Reference will now be made in detail to the present examples, including examples illustrated in the accompanying drawings. Wherever possible, the same reference numbers will be used throughout the drawings to refer to the same or like parts.

An attached Appendix describes an exemplary solution and should not be read in a limiting fashion. Additional notes also follow the below discussion, prior to the three sections of example claims.

The speed dating can be carried out by a server that communicates with multiple user devices. The user devices can execute dating applications that exchange information with the server. The dating application can also execute as a web-based application in an example, such as by using a browser or a hybrid client-side application. Likewise, the server can include one or more webservers in an example.

The dating application can allow the user to engage in a dating cycle. For example, a dating cycle can include multiple short independent video interactions, such as five consecutive 60 second chats with different users. Users can be matched based on an algorithm that chooses from a pool of available users in the system during any given session and places them into a disbursement pool. A matching engine will then take into account the predetermined preferences a user has indicated on their profile and launch fitting pairs of users from the disbursement pool to create individual dates.

An organizer platform can allow an organizer to create events for live dating or simply meeting people using the speed dating infrastructure.

As will be described below, the dating cycle can provide a user with a last look at themselves to make any adjustments before the first of the video chats begins. The last looks screen can prompt the user regarding appearance, lighting, or background noise to help the user make a positive impression. Users can also artificially manipulate their image using built in tools, in an example. The video chats themselves can include options for sending gifts to a dating partner. These gifts can be symbolic or actual. Additionally, the user may elect to allow spectators. Spectators can then watch dates where the pair of users have agreed to spectators, with spectators also being allowed to send gifts to the users participating in the dates.

When the series of video chats ends, live date stats can be displayed. The user can indicate whether they are interested in matching with some subset of their dating partners from the series of video chats. If the pair of users both indicate one another, then they are added to each other's preferred list. Dates can remain on the preferred list for a period of time and be contacted by text, video, or phone through selecting the user in the preferred list from within the dating application.

The organizer platform can execute on a server and include a graphical user interface ("GUI") that a user can access for setting up speed dating events. Although the term "speed dating" is used, all of the examples can apply to any kind of video chatting, such as mingling among people of all sexes that are at a party or have a particular interest in common. The organizer platform allows a user to define how the speed dating events will be sequenced, including the interjection of content between the video chats in the dating cycle.

In one example, the GUI receives participant criteria and event details from an organizer platform. For example, the event can have an invitee list, credentials required (e.g., a password), a date and time, an entry fee, and maximum numbers of males and females.

During a time defined in the event details, the server can determine users that are active for a dating cycle, including a first user associated with a first user device that executes a dating application. Organizer content can be sent to the first user device and displayed at times specified based on a template defined as part of the event details, in an example. For example, the first organizer content can be displayed on the first user device for display prior to a first video chat, in accordance with the template designed by the user of the organizer platform.

The template can then specify that the first video chat will initiate between the first user and a second user. The first and second users can have attributes that match preferences of the other, wherein the first video chat is part of a dating cycle of multiple video chats for the first user. When a time limit is reached, the first video chat ends. The template can specify the triggering the display of intermission organizer content after one or more of the video chats. In general, the template can specify initiating multiple additional video chats for the first user and other users as part of the first user's dating cycle, wherein the display of intermission organizer content between video chats is governed by the event details (e.g., the template).

The first user can then make selections that indicate who the first user wishes to follow up with. When one of the other users also selects to follow up with the first user, the server can provide the first user device and user device of the other user with an option for making a follow-up contact.

To create an event, an organizer user can user the GUI and make a selection to create the new event. The user can then select an event format for the event, wherein the event format determines a schedule for staggering organizer content and video chat cycles. The schedule can be edited, such as by dragging content interludes between, before, and after different dates in the overall date cycle sequence. The GUI can receive event details, including start and end times. The user can also drag or select organizer content to display during the event on user devices that participate in the video chat cycles. receiving a selection to publish the event, wherein the event is joinable by user devices for participants that meet criteria of the event details, and wherein the organizer content and dating cycles occur at the joined user devices at times based on the event details and event format.

The GUI of the dating application can display a list of events including an organizer-created event, wherein for the organizer-created event the GUI displays a start time and admission fee, wherein the event is created by the organizer through use of an event creation platform. A user of the application can select to attend the organizer created event, including submission of a password for the event. This can lead to the event running according to the event details at the scheduled time, including video chatting multiple times according to a chat cycle defined for the event. Organizer content submitted through the event creation platform displays between first and second of the video chats. The user device can receive organizer content to display during the event on the user device during the video chat cycles. This can include playing an organizer-created video on the GUI at a conclusion of the dating cycle.

FIG. 1 is an example flow chart showing example stages for a server creating and orchestrating a speed dating event. At stage 110, the a server receives participant criteria and event details from an organizer platform. This is discussed more with respect to FIG. 2. Continuing with FIG. 1, at stage 120, during a time defined in the event details, the server determines users that are active for a dating cycle, including a first user associated with a first user device that executes a dating application. At stage 130, the server sends first organizer content to the first user device for display prior to a first video chat. This can include graphics or videos uploaded onto the organizer platform by the organizer user. Additionally, event details, such as a template, can dictate which content to send to the first user device. Some content is not sent until after a few video dates have occurred, in an example, as defined by the template.

At stage 140, the server or dating application on the first user device can initiate the first video chat between the first user and a second user. The first and second users can have attributes that match preferences of the other, wherein the first video chat is part of a dating cycle of multiple video chats for the first user. In an example, the dating application presents a last look of the first user prior to the user being active for the dating cycle, wherein the last look screen includes the first organizer content, and wherein the first user becomes active by selecting an option to begin the dating cycle while being presented with the last look. The last look can include prompts for improving an appearance of the first user, and wherein the option to being starts a countdown timer that displays in the dating application. The dating application can detect lighting levels and notifies the first user during the last look when different lighting is needed. The last look can also include an option for applying artificial reality to an image of the first user, wherein the artificial reality remains in place for the first and second video chats. The last look can also include an option for changing a voice tone or a voice pitch of the first user. The first video chat can include background music selected in the dating application by the first user.

At stage 150, when a time limit is reached, the dating application or server ends the first video chat and displays intermission organizer content. This can include some kind of promotional message by the organizer. The first user will likely watch it since additional video chats occur afterwards.

At stage 160, the server initiates multiple additional video chats for the first user and other users as part of the first user's dating cycle. Display of intermission organizer content between video chats is governed by the event details.

At stage 170, the dating application GUI receives selections from the first user device of other users that the first user wishes to follow up with. At stage 180, when one of the other users also selects to follow up with the first user, providing the first user device and user device of the other user with an option for making a follow-up contact.

FIG. 2 is an example flow chart showing example stages of an organizer platform for an organizer-created speed dating event. At stage 210, the organizer can receive, on a graphical user interface ("GUI") displayed on a user device, a selection to create a new event.

When creating a new event, an Organizer can have the option between two event types. The first type of event can be a Speed Dating Event. Speed Dating Events are great for Organizers who want to host a dating experience for singles to meet new people in their city, nationwide, or worldwide. The second event type can be a Connect Event. Connect Events are great for Organizers who want to create an event for people to network, socialize, and make new connections. This event type is good for Business organizations who want to pair people with common interest, or social organizations who seek to pair people with no particular agenda or specific criteria.

To create either of the two event types, Organizers can enter the following information:
    a. Unique event name
    b. Description outlining the details of the event
    c. Start time
    d. End time
    e. Unique Password to enter the event (optional)
    f. Admission fee The Organizer can have the ability to make their event a public or private event. If the Organizer chooses to make their event private, they can create a unique password that guests will be required to enter to gain access to the event. If they do not want to make a unique password, the system will auto generate one for them.

At stage 220, the GUI can receive selection of an event format for the event, wherein the event format determines a schedule for staggering organizer content and video chat cycles. This can include a template that the organizer selects or edits. The template can control where and when in relation to the video chats the organizer content gets displayed. At stage 230, the GUI can receive event details, including start and end times. The GUI, at stage 240, can receive organizer content to display during the event on user devices that participate in the video chat cycles.

As example, an Organizer can select an event format that that follows, but is not limited to, the following structure:
    i. Introductory video (5 mins max)
    ii. Dating Cycles (30 mins)
    iii. Intermission (5 mins max)
    iv. Dating Cycles (20 mins)
    v. Closing remarks video (5 mins max).

The Organizer can then upload the following:
    i. An Introductory video that will welcome all participants to their event
    ii. An Intermission video that will play halfway through the event
    iii. A closing remarks video that thanks all participants for coming to their event.

Another selectable format can have the following structure:
    i. Introductory video (5 mins max)
    ii. Dating Cycles (50 mins)
    iii. Closing remarks video (5 mins max).

The Organizer can then upload the following:
    i. An Introductory video that will welcome all participants to their event
    ii. A closing remarks video that thanks all participants for coming to their event.

The event format can specify segments for playing prerecorded organizer content, and wherein the GUI prompts for upload of at least one video for playing as the organizer content. The event format specify segments for live organizer content, and wherein the GUI prompts the organizer to livestream at times determined based on event details and the event format. The GUI can prompt for graphics that the organizer selects for display during the event, wherein the graphics display at user devices of event participants between video chats in the dating cycles for those participants. The graphics can display on shutters between video chats. The shutters can displayed on the user devices between video chats, the shutters including the graphics.

In one example, if the Organizer wishes to not upload their own pre-recorded videos, they will have an option to use pre-recorded videos that Dating App has produced. Organizers can also have the option to livestream their Introductory, Intermission, and Closing videos. If they choose to do this, they can have an option to still upload a pre-recorded video that will serve as a redundancy system if their live connection fails for any reason. If they choose to not upload any of their own videos, Dating App Pre-recorded videos will play in their place.

In addition to setting up an event structure, Organizers can personalize their events by designing and uploading cover art, videos, and or graphics for their event. Upon entering an Organizers event users will enter a fully branded experience that the Organizer has designed. Users will see any associated marketing material that the organizer has created for the event. Organizers can customize the colors so that the experience is a fully branded experience. Organizers can additionally customize the ads that are shown within the event so that they can promote their own products or likeness if they choose to. If an Organizer partners with a sponsor for their event, the sponsor will be able to place their own ads in the event.

Organizers can also customize the new date shutter that opens when a new date or video interaction has begun, putting their own image on the shutter as opposed to the traditional brand colors that display. Once a format is selected and all additional customization is inputed, the event creation is completed.

At stage 250, the GUI can receive a selection to publish the event, wherein the event is joinable by user devices for participants that meet criteria of the event details, and wherein the organizer content and dating cycles occur at the joined user devices at times based on the event details and event format.

The Organizer can now publish their event to the Dating App. Upon successful completion, the Organizer will be brought to a confirmation page that shows a summary of all the details surrounding their event. A link will be generated and displayed on the confirmation page that the Organizer can share to users in the app ecosystem, as well as users who have not created an account yet. Simultaneously, the newly created event will become visible on the "Events" page within the Dating App. The Events page is a running list of all upcoming, as well as on-going Organizer events within the app.

Once live on the Events page, users will be able to scroll to the event, see a preview of event details, and click a "Read More" button. After clicking this button, users can see a full overview of the Event with the following information displayed, but not limited to:

i. The Organizers name
ii. The start time
iii. The end time
iv. The admission fee
v. A description of the event
vi. The option to "Reserve My Spot".

If a user decides to attend the event, they can be required to reserve their spot. After clicking the "Reserve My Spot" button, the user can be prompted to first enter the event password, and then can be prompted to complete the admission transaction (if the event has an associated password and fee). Once both are completed, the user can be brought to a confirmation page that indicates that they are signed up and registered for the event.

After successfully reserving their spot, the event can be added under a tab on the Events page entitled "Attending".

The Attending tab can be a running list of all the event's a user has reserved their spot to. When the day comes to join the Organizers created event, the users receive a push notification informing them of their upcoming event, and then can be brought to the "Attending" tab where they can see that the event has become available to join. They can join the event through a button entitled "Join Event".

Once a user has clicked this button they can be brought to a unique landing page for their event. Depending on when a user joins, they may see either a 5 minute countdown, pre-recorded content an Organizer has created, or Dating App videos. Once the event has started a button entitled "Start" can be present that can take them straight into the event.

Once a user hits "Start", they can immediately be taken to an advertisement commercial provided by our ad service, or a sponsored ad from an event partner. Following this they can be taken to an Introductory video that the Organizer has pre-recorded, or see some other pre-recorded video. After this video has concluded the user can be brought to their Last Looks screen where they can see a full video preview of themselves, making any adjustments to their appearance before joining their Speed Dating event or Connect event.

Halfway through the duration of the event, the event Organizers Intermission video can begin playing. If a user is still on a date or video interaction when this halfway point is reached, the system can allow the user to finish the date/interaction they are on, then immediately pause their video stream to play the pre-recorded Intermission video. After the Intermission video has finished, the user can be served a number of video ads, and then have the option to continue on with their dating cycles.

At the conclusion of the timed event, the last pre-recorded video can play, the closing remarks video. This video can thank all participants for attending the event. Once this video has completed, the event can end and all users can be redirected to the home screen of the application.

Once an event is live, the event Organizer can be able to log back into the Organizer Platform tool via the web or their mobile device to moderate, manage, and interact with all participants in their event.

Prior to an event starting Organizers can be able to go LIVE and interact with participants in their event. Participants can be able to write comments that can appear in real time to all other users in the event, overlaid on top of the Organizers live stream. These comments can be paired with a user's name, and their profile picture. Organizers can be able to see a list of names, showing all the people who are attending their event. They can be able to filter this list and view participants by, but not limited to: name, location, gender, and/or age.

Organizers can be able to select a user to join them on the livestream. Once joined, the Organizer and the user selected can be visible to all participants in the event via a split screen.

Organizers can be able moderate events by removing users from the event who are deemed as bad actors. If a user is removed from an event, the Organizer can need to provide a reason as to why they removed the user. Once the Organizer submits the request to remove the user, the user can automatically be removed from the event, and will not be able to rejoin this specific event.

The user who has been removed can immediately receive an email stating why they were removed from the event, and can have an option of disputing the reason for a potential refund. Organizers can be able to, in real time, send text strings that can appear on screen to all participants in an event. A way in which this can be used, is an organizer typing in prompts or icebreaker topics that all participants can be able to see, and then discuss.

Organizers can be able to pause all dating cycles at any given moment in time to make any special announcements that can be broadcasted LIVE to every participant in the event. These announcements can be video and audio, or just audio.

An Organizer can have the ability to stream music to all people in their event during the duration of the event. A user can have an adjustment control on their device that can allow them to adjust the audio track that the organizer is playing.

During an Intermission period, Organizers can be able to select a user from the participant list and have them "Go LIVE" to talk to all participants in the event.

FIG. 3 is an example flow chart for an organizer-created speed dating event that incorporates live messaging from the organizer. At stage 310, the GUI of the dating application can display on a user device, a list of events including an organizer-created event, wherein for the organizer-created event the GUI displays a start time and admission fee, wherein the event is created by the organizer through use of an event creation platform. The list of events can be populated based on a geographic location of the user device.

At stage 320, the GUI can receive selection to attend the organizer created event, including submission of a password for the event.

At stage 330, the system can cause the first user device to video chat multiple times according to a chat cycle defined for the event, wherein organizer content submitted through the event creation platform displays between first and second of the video chats. For example, during a first video chat of the chat cycle, the first user device can display an intermission organizer video on the GUI. When the first video chat is less than half complete, pausing the first video chat until a conclusion of the intermission video. When the first video is more than half complete, the server or dating application can end the first video chat.

At stage 340, the first user device can receive organizer content to display during the event on the user device and other user devices that participate in the video chat cycles. In one example, the intermission video is live streamed from an organizer device.

At stage 350, the first user device can play an organizer-created video on the GUI at a conclusion of the dating cycle. In one example, the first user device can receive a pause message initiated at an organizer device. In response, the application can pause a current video chat in the chat cycle until a message from the organizer device is complete.

In one example, the GUI displays a button during the chat cycle for donating as part of the event. During the event the user devices can display an option in connection with the event that allows for buying gifts or submitting donations to the event organizer, wherein the option is specified on the GUI as part of the event details.

Users who are not Organizers will be able to access, search and scroll through all public events that have been created by Organizers around the world through the "Events" page. This page will have two tabs, the first tab will be entitled "All", which will have a list of all events in the app. The second tab will be entitled "Attending", which will only show events that the user has signed up for.

The events page will have information about a particular event displayed on information cards. This page will allow users to browse and filter through events using the following methods:

i. Filtering by location
    ii. Filtering by Interest
    iii. Filtering by Age Range
    iv. Filtering by Price c. As a user is scrolling through all various events on the app they will see a preview of the information associated with a particular event. The information includes, but is not limited to:

i. The event name
    ii. The event host
    iii. The event start time
    iv. The event end time
    v. A preview of the description
    vi. The amount of people attending the event
    vii. The price of the event d. Once a user has located an event they are interested in, they will be able to read more about the event by clicking on the "Read More" button located at the bottom of the information card. If a user chooses to attend a particular event, they will click the "Reserve My Spot" button located at the bottom of the page. If the event requires any password or admission, they will then be prompted to enter the necessary information, and submit their payment.

If an event is set to private, the user will be able to "request" access to join the event. If the request is approved by the host, the guest will be added to the event. After a user has successfully signed up for an event, they will receive a confirmation message informing them of their successful sign up. On the day of their event users will receive a push notification that will inform them of their upcoming event, and they will then be able to join the event.

If an Organizer chooses to do their Introductory video, Intermission video, and Closing remarks video LIVE, users will have the ability to interact with the Organizer by writing live comments that will show up on screen to all participants watching. Users will be also able to send gifts to the Organizer during this LIVE interaction. If an Organizer chooses to, they can choose any participant to join them LIVE on screen, and the user will be broadcasted to all users in the event. The organizer can end this feed at any point in time.

FIG. 4 is omitted.

Figure 5:
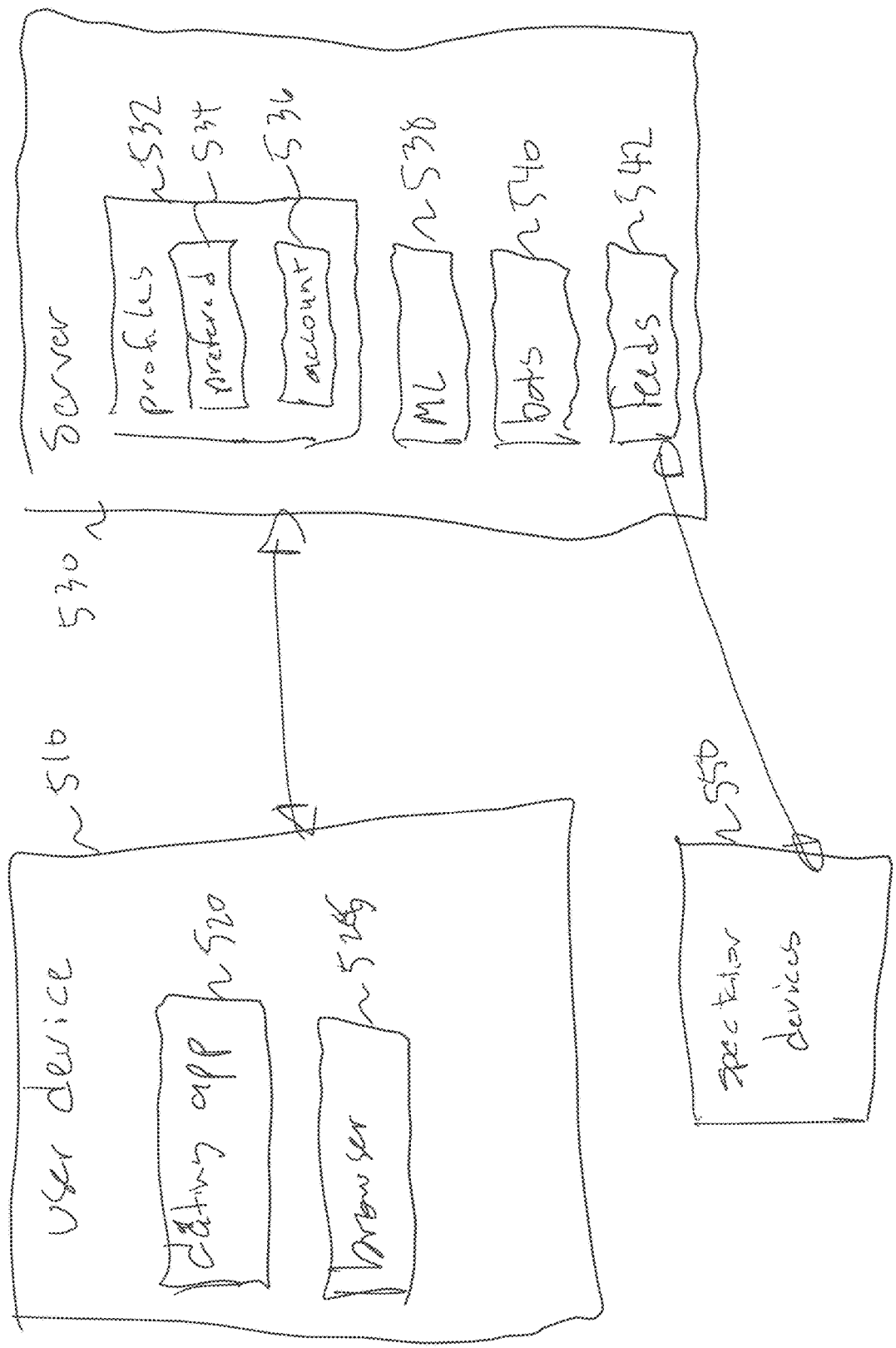
FIG. 5 is an example illustration of GUI screens for an organizer platform.

FIG. 5 includes an exemplary diagram of a system in accordance with an example. Multiple user devices 510, 550 can connect to the server 530 as part of executing a meetup or dating application 520. The server 530 can create and host events. The organizer can use a user device 510 to cause the server to create an event using the organizer platform of the application 520. A user device 510, 550 can be any processor-based device, such as a personal computer, laptop, tablet, or cell phone. The user device 510 can display the dating application or organizer platform GUI by executing a set of instructions stored locally or remotely on a computer-readable medium.

The server 530 can alternatively be accessed by a browser 525 in an example. It is understood that the dating application 520 can be a web application provided by the server 530 for execution in the browser 525, in an example.

The server 530 can include one or more servers operating in the cloud, in an example. Physical hardware can execute virtual servers in an example.

The server 530 can store and track user profiles 532 that can accumulate user preference information 534 and can include information about the user's account 536. A machine learning algorithm or model 538 can be used as part of a matching engine for selecting date matches between users based on the preferences 534. Additionally, a bot 540 can utilize an ML model 538 and user preferences 534 to converse with the user. Video feeds 542 can be managed by the server 530 and also broadcast to spectator devices 550, in an example.

Figure 7:
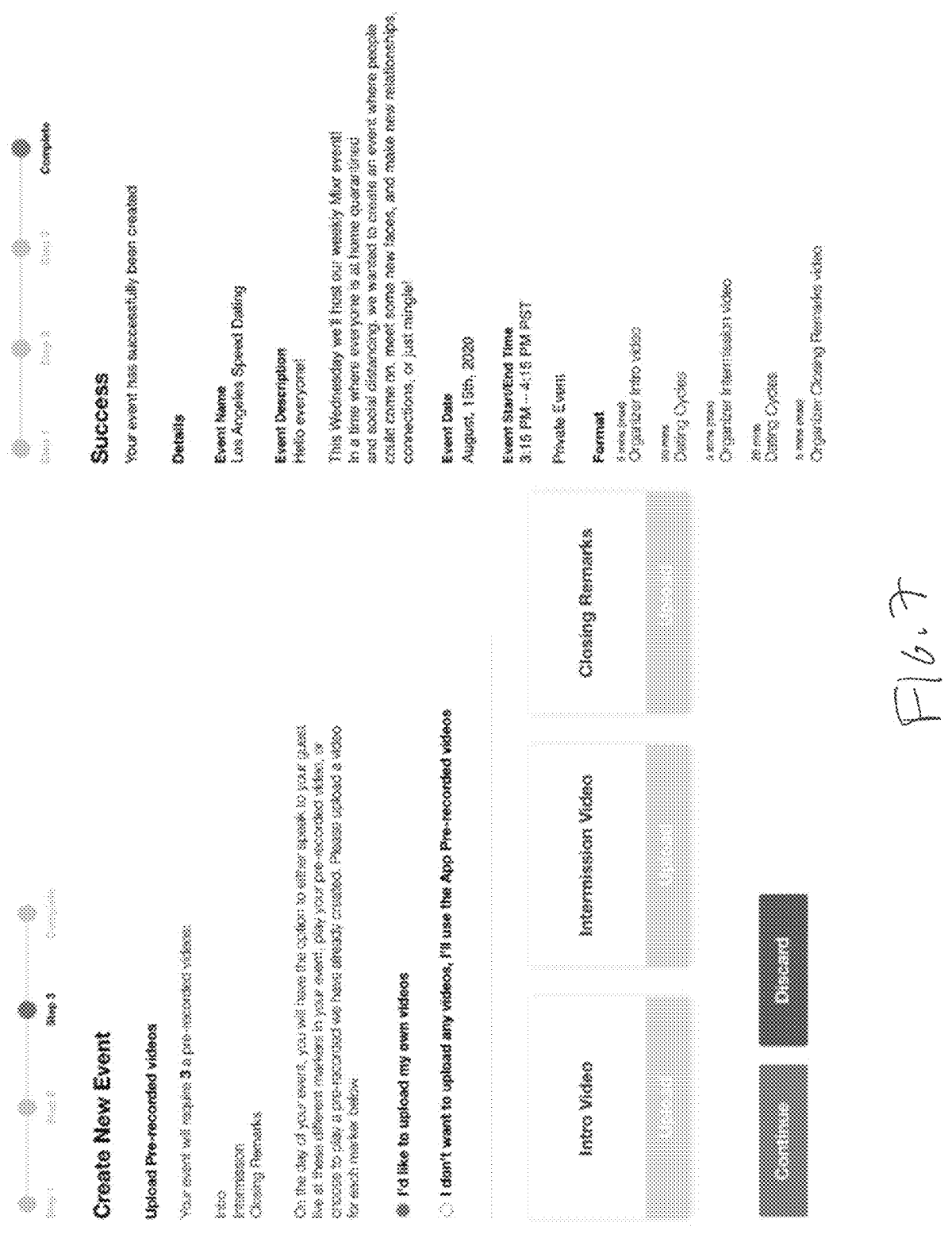

FIGS. 6 and 7 include example GUI screens. Screens 610 and 620 are "last looks" screens. Screen 710 shows a video chat (date) that is part of a date cycle. Screen 720 is a cycle review screen that allows the user to select preferred matches. Screen 730 shows a preferred date list.

Additional features can include:

- Sponsored event - skin on shutters between dates
- Gesture enabled emojis (WebEx)
- Profile accessible once there's a match
- Host event organizing
    - Organizer platform
    - Verification code to phone
    - Create event
        - Name, time start and end, admission price, password
            - Price scales with size ($10 per person)
            - Discount for premium subscribers
            - Splits between organizer and App company
        - Skins on shutters
            - Multiples possible
            - Choose format - Placement of videos
                - Organizer intro video
                - Mid video
                - Closing video
            - Live waiting room, intermission
            - Celebrity feed/shoutout
        - Criteria for participants
        - Upload materials
- Ad plus organizer intro prior to last looks
- Removing user from event
    - Moderate from same device that you're using in real time
- Managing a live event
    - View details - cycles, name, profile, connections
- Live vs prerecorded
    - Pause cycle for live stream, then put them back in their cycle
- Gifts to organizer
    - While they are live
    - Charity component
- Phone to smart TV
    - Or app on smart TV
    - Gesture motion

What is claimed is:

1. A method for speed dating, comprising:

receiving participant criteria and event details from an organizer platform;

during a time defined in the event details, determining users that are active for a dating cycle, including a first user associated with a first user device that executes a dating application;

sending first organizer content to the first user device for display prior to a first video chat;

initiating the first video chat between the first user and a second user, the first and second users having attributes that match preferences of the other, wherein the first video chat is part of a dating cycle of multiple video chats for the first user;

when a time limit is reached, ending the first video chat, and triggering display of intermission organizer content;

initiating multiple additional video chats for the first user and other users as part of the first user's dating cycle, wherein the display of intermission organizer content between video chats is governed by the event details;

receiving selections from the first user device of other users that the first user wishes to follow up with; and when one of the other users also selects to follow up with the first user, providing the first user device and user device of the other user with an option for making a follow-up contact.

2. The method of claim 1, wherein the dating application presents a last look of the first user prior to the user being active for the dating cycle, wherein the last look screen includes the first organizer content, and wherein the first user becomes active by selecting an option to begin the dating cycle while being presented with the last look.

3. The method of claim 2, wherein the last look includes prompts for improving an appearance of the first user, and wherein the option to being starts a countdown timer that displays in the dating application.

4. The method of claim 3, wherein the dating application detects lighting levels and notifies the first user during the last look when more or less lighting is needed.

5. The method of claim 3, wherein the last look includes an option for applying artificial reality to an image of the first user, wherein the artificial reality remains in place for the first and second video chats.

6. The method of claim 3, wherein the last look includes an option for changing a voice tone or a voice pitch of the first user.

7. The method of claim 1, wherein the first video chat includes background music selected in the dating application by the first user.

8. A method for speed dating, comprising:

receiving, on a graphical user interface ("GUI") displayed on a user device, a selection to create a new event;

selecting an event format for the event, wherein the event format determines a schedule for staggering organizer content and video chat cycles;

receiving event details, including start and end times;

receiving organizer content to display during the event on user devices that participate in the video chat cycles; and receiving a selection to publish the event, wherein the event is joinable by user devices for participants that meet criteria of the event details, and wherein the organizer content and dating cycles occur at the joined user devices at times based on the event details and event format.

9. The method of claim 8, wherein the selection to create a new event includes selecting between at least a dating event and a socializing event.

10. The method of claim 8, wherein the event format specifies segments for playing pre-recorded organizer content, and wherein the GUI prompts for upload of at least one video for playing as the organizer content.

11. The method of claim 8, wherein the event format specifies segments for live organizer content, and wherein the GUI prompts the organizer to livestream at times determined based on event details and the event format.

12. The method of claim 8, wherein the GUI prompts for graphics that the organizer selects for display during the event, wherein the graphics display at user devices of event participants between video chats in the dating cycles for those participants.

13. The method of claim 8, wherein shutters are displayed on the user devices between video chats, the shutters including the graphics.

14. The method of claim 8, wherein during the event the user devices display an option in connection with the event that allows for buying gifts or submitting donations to the event organizer, wherein the option is specified on the GUI as part of the event details.

15. A method for speed dating, comprising:
    displaying, on a graphical user interface ("GUI") of a user device, a list of events including an organizer-created event, wherein for the organizer-created event the GUI displays a start time and admission fee, wherein the event is created by the organizer through use of an event creation platform;
    receiving selection to attend the organizer created event, including submission of a password for the event;
    video chatting multiple times according to a chat cycle defined for the event, wherein organizer content submitted through the event creation platform displays between first and second of the video chats;
    receiving organizer content to display during the event on the user device and other user devices that participate in the video chat cycles; and
    playing an organizer-created video on the GUI at a conclusion of the dating cycle.

16. The method of claim 15, wherein the list of events is populated based on a geographic location of the user device.

17. The method of claim 15, further comprising:
    during a first video chat of the chat cycle, displaying an intermission organizer video on the GUI;
    when the first video chat is less than half complete, pausing the first video chat until a conclusion of the intermission video; and
    when the first video is more than half complete, ending the first video chat.

18. The method of claim 17, wherein the intermission video is live streamed from an organizer device.

19. The method of claim 15, further comprising:
    receiving a pause message initiated at an organizer device; and
    pausing a current video chat in the chat cycle until a message from the organizer device is complete.

20. The method of claim 15, wherein the GUI displays a button during the chat cycle for donating as part of the event.

\* \* \* \* \*